United States Patent
Huang et al.

(10) Patent No.: US 11,664,692 B2
(45) Date of Patent: May 30, 2023

(54) ROTOR STRUCTURE, PERMANENT MAGNET AUXILIARY SYNCHRONOUS RELUCTANCE MOTOR AND ELECTRIC VEHICLE

(71) Applicant: GREE ELECTRIC APPLIANCES, INC. OF ZHUHAI, Guangdong (CN)

(72) Inventors: Hui Huang, Zhuhai (CN); Yusheng Hu, Zhuhai (CN); Bin Chen, Zhuhai (CN); Yong Xiao, Zhuhai (CN); Tong Tong, Zhuhai (CN); Suhua Lu, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 417 days.

(21) Appl. No.: 16/981,258

(22) PCT Filed: Dec. 7, 2018

(86) PCT No.: PCT/CN2018/119876
§ 371 (c)(1),
(2) Date: Sep. 15, 2020

(87) PCT Pub. No.: WO2019/174327
PCT Pub. Date: Sep. 19, 2019

(65) Prior Publication Data
US 2021/0044167 A1    Feb. 11, 2021

(30) Foreign Application Priority Data
Mar. 16, 2018  (CN) .......................... 201810219857.0

(51) Int. Cl.
*H02K 1/27* (2022.01)
*H02K 1/276* (2022.01)
(Continued)

(52) U.S. Cl.
CPC .......... *H02K 1/2766* (2013.01); *H02K 19/103* (2013.01); *H02K 21/12* (2013.01); *H02K 29/03* (2013.01); *H02K 2213/03* (2013.01)

(58) Field of Classification Search
CPC .... H02K 1/2766; H02K 19/103; H02K 21/12; H02K 29/03; H02K 2213/03; H02K 1/274; Y02T 10/64
See application file for complete search history.

(56) References Cited

U.S. PATENT DOCUMENTS

2017/0187257 A1* 6/2017 Liu .................. H02K 21/16
2019/0238014 A1* 8/2019 Kol .................. H02K 1/2766

FOREIGN PATENT DOCUMENTS

CN  101057381 A  10/2007
CN  103280904 A  9/2013
(Continued)

OTHER PUBLICATIONS

Extended European Search Report for European Application No. 18909962.5 dated Mar. 22, 2021 (10 pages).
(Continued)

*Primary Examiner* — Thomas Truong
(74) *Attorney, Agent, or Firm* — J. Miguel Hernandez; James R. Gourley; Carstens, Allen & Gourley, LLP

(57) ABSTRACT

Disclosed are a rotor structure, a permanent magnet auxiliary synchronous reluctance motor, and an electric vehicle. The rotor structure includes a rotor body; the rotor body is provided with permanent magnet slot groups each including multiple layers of permanent magnet slots; the multiple layers of permanent magnet slots include a first permanent magnet slot; and the first permanent magnet slot includes a first permanent magnet slot section and a first bent slot. A first end of the first bent slot is connected to a second end of the first permanent magnet slot section, a second end of the
(Continued)

first bent slot is arranged to extend toward an outer edge of the rotor body.

20 Claims, 13 Drawing Sheets

(51) Int. Cl.
    *H02K 19/10*     (2006.01)
    *H02K 21/12*     (2006.01)
    *H02K 29/03*     (2006.01)

(56) References Cited

FOREIGN PATENT DOCUMENTS

| CN | 105958690 | A | 9/2016 |
|----|-----------|---|--------|
| CN | 205566051 | U | 9/2016 |
| CN | 106329773 | A | 1/2017 |
| CN | 108321951 | A | 7/2018 |
| CN | 108321952 | A | 7/2018 |
| CN | 108321955 | A | 7/2018 |
| CN | 108336844 | A | 7/2018 |
| CN | 108336845 | A | 7/2018 |
| CN | 108566006 | A | 9/2018 |
| CN | 208094312 | U | 11/2018 |
| EP | 2018696   | B1 | 8/2019 |
| JP | 2011083066 | A | 4/2011 |
| WO | 2015120959 | A1 | 8/2015 |

OTHER PUBLICATIONS

International Search Report for Application No. PCT/CN2018/119876 dated Mar. 6, 2019 (3 pages).

* cited by examiner

ROTOR STRUCTURE, PERMANENT MAGNET AUXILIARY SYNCHRONOUS RELUCTANCE MOTOR AND ELECTRIC VEHICLE

CROSS REFERENCE TO RELATED APPLICATIONS

This application claims all benefits accruing under 35 U.S.C. § 119 from China Patent Application No. 201810219857.0, filed on Mar. 16, 2018 in the China National Intellectual Property Administration, the entire content of which is hereby incorporated by reference. This application is a national phase under 35 U.S.C. § 120 of international patent application PCT/CN2018/119876, entitled "ROTOR STRUCTURE, PERMANENT MAGNET AUXILIARY SYNCHRONOUS RELUCTANCE MOTOR AND ELECTRIC VEHICLE" filed on Dec. 7, 2018, and published as WO 2019/174327 on Sep. 19, 2019, the content of which is also hereby incorporated by reference.

FIELD

The present disclosure relates to the technical field of motor equipment, in particular, to a rotor structure, a permanent magnet auxiliary synchronous reluctance motor and an electric vehicle.

BACKGROUND

Electric vehicles have the characteristics of energy saving and environmental friendship, and have developed rapidly. In order to realize the functions of high power density and high efficiency of the motor, the existing drive motors of electric vehicles are increasingly using high-performance rare earth permanent magnet motors. Mainly depending on high-performance rare earth permanent magnets, the rare earth permanent magnet motor can achieve high efficiency and high power density. Currently, the most widely used rare earth permanent magnets are NdFeB rare earth permanent magnets. However, rare earth is a non-renewable resource, and the price of rare earth is relatively expensive and fluctuates greatly, resulting in higher production costs of the drive motors of the electric vehicles, which is a terribly unfavorable for promoting the comprehensive development of the electric vehicles. Further, in the prior art, a ferrite permanent magnet auxiliary synchronous reluctance motor is applied to the electric vehicle, however, such a motor has problems of large noise, being easily demagnetized, and low efficiency.

SUMMARY OF THE INVENTION

The present disclosure relates to a rotor structure, a permanent magnet auxiliary synchronous reluctance motor and an electric vehicle, so as to solve the problem of low efficiency of the motor in the prior art.

In accordance with one aspect of the present disclosure, a rotor structure is provided. The rotor structure includes a rotor body; the rotor body is provided with permanent magnet slot groups; the permanent magnet slot groups each include multiple layers of permanent magnet slots; the multiple layers of permanent magnet slots include a first permanent magnet slot; the first permanent magnet slot includes a first permanent magnet slot section and a first bent slot;

a first end of the first permanent magnet slot section is arranged to extend toward a rotation shaft hole of the rotor body; a second end of the first permanent magnet slot section is arranged toward an outer edge of the rotor body;

a first end of the first bent slot is connected to the second end of the first permanent magnet slot section; a second end of the first bent slot is arranged to extend toward the outer edge of the rotor body; A denotes a distance from a midpoint of a side wall of the second end of the first bent slot, which is adjacent to the outer edge of the rotor body, to an intersection point of a geometric center line of the first permanent magnet slot section and the outer edge of the rotor body, and M denotes a width of the second end of the first permanent magnet slot section, wherein $0.6M \leq A$.

Further, an included angle is formed between a plane where a side wall of the first bent slot adjacent to a direct-axis is located and a plane where a side wall of the first permanent magnet slot section adjacent to the direct-axis is located.

Further, a first magnetic barrier bridge is formed between the second end of the first bent slot and the outer edge of the rotor body; $0.4 \times M \leq (H-H1)$, or $0.4 \times M \leq (H-H1) \leq 2 \times M$ is satisfied; wherein M denotes the width of the second end of the first permanent magnet slot section; H denotes a distance from the second end of the first permanent magnet slot section to the outer edge of the rotor body; and H1 denotes a width of the first magnetic barrier bridge.

Further, a width of the first end of the first bent slot is less than a width of the second end of the first permanent magnet slot section, and/or a width of the second end of the first bent slot is less than a width of the second end of the first permanent magnet slot section.

Further, $0.25 \times M \leq D1 \leq 0.8 \times M$, or $0.3 \times M \leq D1 \leq 0.45 \times M$, wherein M denotes the width of the second end of the first permanent magnet slot section, and D1 denotes a width of the second end of the first bent slot.

Further, the first permanent magnet slot further includes a second permanent magnet slot section;

a first end of the second permanent magnet slot section is arranged to extend toward the rotation shaft hole of the rotor body and is connected to a first end of the first permanent magnet slot section; a second end of the second permanent magnet slot section is arranged toward the outer edge of the rotor body; and the first permanent magnet slot section and the second permanent magnet slot section are disposed at two sides of a direct-axis of the rotor body; or the first end of the second permanent magnet slot section is arranged to extend toward the rotation shaft hole of the rotor body and is arranged to keep a distance from the first end of the first permanent magnet slot section; the second end of the second permanent magnet slot section is arranged toward the outer edge of the rotor body; and the first permanent magnet slot section and the second permanent magnet slot section are disposed at two sides of the direct-axis of the rotor body.

Further, the first permanent magnet slot further includes a second bent slot;

a first end of the second bent slot is connected to the second end of the second permanent magnet slot section; a second end of the second bent slot is arranged to extend toward the outer edge of the rotor body; a distance between a terminal end of the second bent slot and a quadrature-axis of the rotor body is less than a distance between a terminal end of the second end of the second permanent magnet slot section and the quadrature-axis.

Further, the first bent slot and the second bent slot are arranged symmetrically relative to the direct-axis.

Further, the permanent magnet slot groups each further include a second permanent magnet slot which is arranged to be adjacent to the first permanent magnet slot; a magnetic flux path is formed between the first permanent magnet slot and the second permanent magnet slot; the second permanent magnet slot includes a third permanent magnet slot section, a fourth permanent magnet slot section and a fifth permanent magnet slot section which are arranged sequentially;

the third permanent magnet slot section, the fourth permanent magnet slot section and the fifth permanent magnet slot section are sequentially connected and form a U-shaped structure with an opening facing the outer edge of the rotor body; or the third permanent magnet slot section, the fourth permanent magnet slot section and the fifth permanent magnet slot section are sequentially arranged and spaced, and second magnetic barrier bridges are formed between adjacent two of the third permanent magnet slot section, the fourth permanent magnet slot section, and the fifth permanent magnet slot section respectively.

Further, the third permanent magnet slot section includes a third bent slot; a first end of the third bent slot is connected to an end of the third permanent magnet slot section adjacent to the outer edge of the rotor body; a second end of the third bent slot extends toward the outer edge of the rotor body and gradually approaches the quadrature-axis;

the fifth permanent magnet slot section includes a fourth bent slot; a first end of the fourth bent slot is connected to an end of the fifth permanent magnet slot section adjacent to the outer edge of the rotor body; and a second end of the fourth bent slot extends toward the outer edge of the rotor body and gradually approaches the quadrature-axis.

Further, the third bent slot and the fourth bent slot are arranged symmetrically relative to the direct-axis.

Further, an extended portion of a side wall of the first bent slot adjacent to the direct-axis and an extended portion of a side wall of the second bent slot adjacent to the direct-axis form an included angle A1, and an extended portion of a side wall of the first permanent magnet slot section adjacent to the direct-axis and an extended portion of a side wall of the second permanent magnet slot section adjacent to the direct-axis form an included angle A , wherein $2 \times A \leq A1$.

Further, an extended portion of a side wall of the third bent slot adjacent to the direct-axis and an extended portion of a side wall of the fourth bent slot adjacent to the direct-axis form an included angle B1, and an extended portion of a side wall of the third permanent magnet slot section adjacent to the direct-axis and an extended portion of a side wall of the fifth permanent magnet slot section adjacent to the direct-axis form an included angle B, where $2 \times B \leq B1$.

Further, $1.1 \times B1 \leq A1$.

Further, the rotor structure further includes a first permanent magnet and a second permanent magnet; the first permanent magnet is disposed in the first permanent magnet slot; and the second permanent magnet is disposed in the second permanent magnet slot.

Further, an included angle $\alpha 1$ is formed between the direct-axis of the rotor body and a straight line, which connects a center of the rotation shaft hole of the rotor body and a point which is adjacent to the edge of the rotor body and in a surface of the first permanent magnet adjacent to the direct-axis side of the rotor body; an included angle $\alpha 2$ is formed between the direct-axis of the rotor body and a straight line, which connects the center of the rotation shaft hole of the rotor body and a point which is adjacent to the edge of the rotor body and in a surface of the second permanent magnet adjacent to the direct-axis side of the rotor body and, and $1.3 \times (\sin \alpha 1/\sin \alpha 2) \leq S1/S2 \leq 2 \times (\sin \alpha 1/\sin \alpha 2)$, wherein S1 denotes an area of a surface of the first permanent magnet adjacent to the direct-axis of the rotor body, and S2 denotes an area of a surface of the second permanent magnet adjacent to the direct-axis of the rotor body.

Further, a thickness of at least part of the second permanent magnet is greater than a thickness of the first permanent magnet.

Further, a thickness of the first permanent magnet is M1, and a thickness of the second permanent magnet is M2, wherein $1.1M1 \leq M2 \leq 1.8 \times M1$.

Further, the second permanent magnet slot includes the third permanent magnet slot section and the fifth permanent magnet slot section; the third permanent magnet slot section includes a third bent slot; the fifth permanent magnet slot section includes a fourth bent slot; a width of a second end of the third bent slot and/or a width of a second end of the fourth bent slot is D2, the thickness of the second permanent magnet is M2, where $D2 \leq 0.6 \times M2$.

Further, P denotes a midpoint of a straight line connecting a midpoint of a side wall of the first permanent magnet slot adjacent to the rotation shaft hole of the rotor body with a closet point in the edge of the rotor body; an arc is drawn in a circumferential direction of the rotor body by taking a center of the rotor body as a center of the arc and taking a distance from the center to the point P as a radius; along the arc, a total sum of thicknesses of the first permanent magnet and the second permanent magnet is M3, and a circumference of the arc is C1, wherein $M3/C1=T2$, and $45\% \leq T2 \leq 70\%$.

Further, L denotes a length of a surface of the first permanent magnet disposed in the first permanent magnet slot section or in the second permanent magnet slot section, wherein the surface of the first permanent magnet is adjacent to the direct-axis, and C denotes a maximum width between the first permanent magnet slot section and the second permanent magnet slot section, wherein $0.8 \times C \leq L$.

Further, a width of the magnetic flux path gradually increases outward in a radial direction of the rotor body, or a width of the magnetic flux path gradually decreases outward in a radial direction of the rotor body, or a width of the magnetic flux path gradually increase outward in a radial direction of the rotor body within a preset distance and then gradually decreases, or a width of magnetic flux path gradually decreases outward in a radial direction of the rotor body within a preset distance and then gradually increases.

Further, multiple permanent magnet slot groups are provided and evenly arranged around the rotor body.

Further, a number of at least one of the second permanent magnet slot and the first permanent magnet slot is plural.

In accordance with another aspect of the present disclosure, a permanent magnet auxiliary synchronous reluctance motor is provided, and includes the rotor structure above.

In accordance with another aspect of the present disclosure, an electric vehicle is provided and includes the rotor structure above.

In the technical scheme of the present disclosure, the first permanent magnet slot includes the first permanent magnet slot section, the second permanent magnet slot section and the first bent slot, and a distance between a length directional geometric center line of the first bent slot and the direct-axis gradually increases outward in the radial direction of the rotor body. Such an arrangement optimizes the magnetic circuit of the rotor structure, and improves the magnetic forces of the rotor structure. Accordingly, the overall anti-demagnetization capability of the rotor structure is effectively improved, thereby increasing the q-axis inductance of the motor, reducing torque ripples of the motor, reducing vibration and noise of the motor, effectively improving the efficiency of the motor having such a rotor structure, and increasing the anti-demagnetization capability of the motor.

BRIEF DESCRIPTION OF THE DRAWINGS

The accompanying drawings constituting a part of the present disclosure are provided to further make the present disclosure understood. The illustrative embodiments of the present disclosure and the description thereof are used to explain the present disclosure, but not intended to limit the present disclosure. In the drawings.

DETAILED DESCRIPTION OF THE PREFERRED EMBODIMENTS

Figure 1:
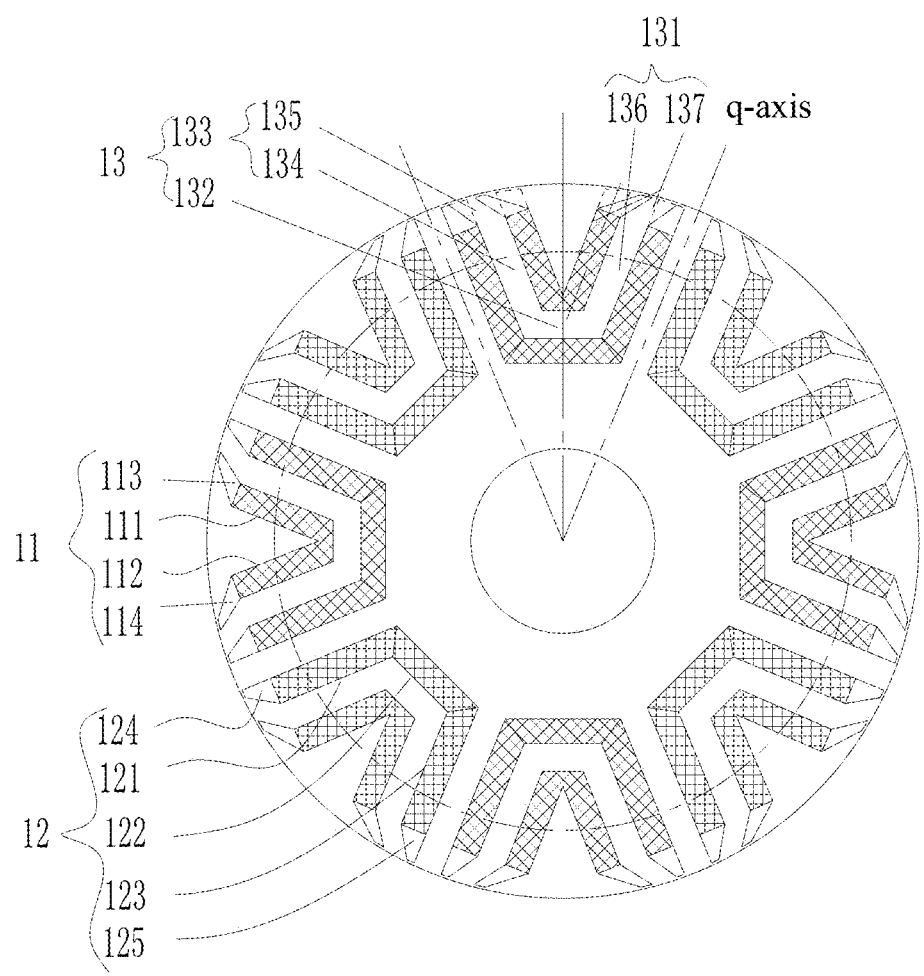
FIG. 1 shows a schematic cross-sectional structure diagram of a rotor structure in accordance with a first embodiment of the present disclosure.
Figure 2:
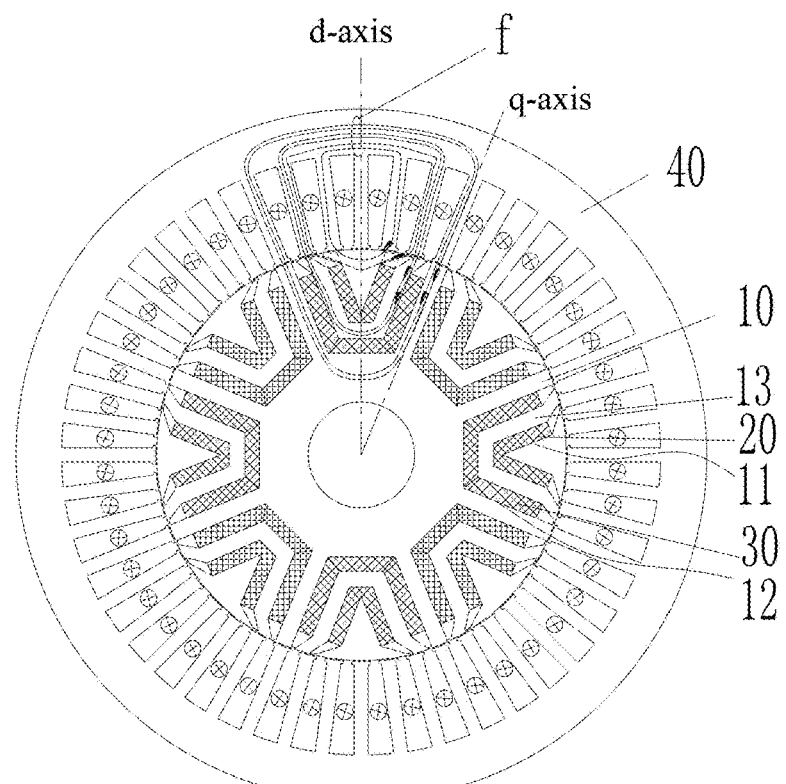
FIG. 2 shows a schematic cross-sectional structure diagram of the rotor structure in accordance with a second embodiment of the present disclosure.

It should be specified that, the embodiments and the features in the embodiments of the present disclosure may be combined with each other when there is no conflict. The embodiments of present disclosure will be described in detail with reference to the accompanying drawings.

With reference to FIGS. 1 to 8 and FIGS. 10 to 19, in accordance with an embodiment of the present disclosure, a rotor structure is provided.

Specifically, the rotor structure includes a rotor body 10. The rotor body 10 is provided with permanent magnet slot groups, and the permanent magnet slot groups each include multiple layers of permanent magnet slots. The multiple layers of permanent magnet slots include the first permanent magnet slot 11. The first permanent magnet slot 11 includes the first permanent magnet slot section 111 and the first bent slot 113; a first end of the first permanent magnet slot section 111 is arranged to extend toward the rotation shaft hole of the rotor body 10; a second end of the first permanent magnet slot section 111 is arranged toward an outer edge of the rotor body 10. A first end of the first bent slot 113 is connected to the second end of the first permanent magnet slot section 111, and a second end of the first bent slot 113 is arranged to extend toward the outer edge of the rotor body 10. A denotes a distance from a midpoint of a side wall of the second end of the first bent slot 113, which is adjacent to the outer edge of the rotor body 10, to an intersection point of a geometric center line of the first permanent magnet slot section 111 and the outer edge of the rotor body 10, and M denotes a width of the second end of the first permanent magnet slot section 111, where 0.6M≤A.

In this embodiment, such an arrangement optimizes the magnetic circuit of the rotor structure, and improves the magnetic forces of the rotor structure. Accordingly, the overall anti-demagnetization capability of the rotor structure is effectively improved, thereby increasing the q-axis inductance of the motor, reducing torque ripples of the motor, reducing vibration and noise of the motor, effectively improving the efficiency of the motor having such a rotor structure, and increasing the anti-demagnetization capability of the motor.

A plane where a side wall of the first bent slot 113 adjacent to a direct-axis (d-axis) is located, and a plane where a side wall of the first permanent magnet slot section 111 adjacent to the direct-axis is located, are coplanar or form an included angle. Such an arrangement can better conduct magnetic induction lines from the stator into each magnetic flux path more evenly.

In addition, a first magnetic barrier bridge is formed between the second end of the first bent slot 113 and the outer edge of the rotor body 10, 0.4×M≤(H−H1), or 0.4× M≤(H−H1)≤2×M is satisfied, where M denotes the width of the second end of the first permanent magnet slot section 111; H denotes a distance from the second end of the first permanent magnet slot section 111 to the outer edge of the rotor body 10; and H1 denotes a width of the first magnetic barrier bridge. Such an arrangement can make the effects of conducting the magnetic induction lines better, and can achieve larger q-axis inductance.

Further, a width of the first end of the first bent slot 113 is less than the width of the second end of the first permanent magnet slot section 111, or a width of the second end of the first bent slot 113 is less than the width of the second end of the first permanent magnet slot section 111. Or both cases exist at the same time. In this way, by gradually reducing a width of a magnetic flux path, the magnetic flux areas of the first permanent magnet and the second permanent magnet can be better adjusted to realize an adjustment for consistency of operating points of the first permanent magnet and the second permanent magnet.

In an embodiment, $0.25 \times M \leq D1 \leq 0.8 \times M$, or $0.3 \times M \leq D1 \leq 0.45 \times M$, where M denotes the width of the second end of the first permanent magnet slot section 111, and D1 denotes the width of the second end of the first bent slot 113. Such an arrangement makes the magnetic induction lines easily pass through the magnetic barrier bridge between the permanent magnet slot of the rotor and the outer circle of the rotor, thereby achieving a larger inductance difference between the quadrature-axis (q-axis) and the direct-axis, and improving the reluctance torque of the motor.

In an embodiment, the first permanent magnet slot 11 further includes a second permanent magnet slot section 112. A first end of the second permanent magnet slot section 112 is arranged to extend toward the rotation shaft hole of the rotor body 10 and is connected to a first end of the first permanent magnet slot section 111; a second end of the second permanent magnet slot section 112 is arranged toward the outer edge of the rotor body 10; and the first permanent magnet slot section 111 and the second permanent magnet slot section 112 are disposed at two sides of the direct-axis of the rotor body 10 respectively. Alternatively, the first end of the second permanent magnet slot section 112 is arranged to extend toward the rotation shaft hole of the rotor body 10 and is arranged to keep a distance from the first end of the first permanent magnet slot section 111; the second end of the second permanent magnet slot section 112 is arranged toward the outer edge of the rotor body 10, and the first permanent magnet slot section 111 and the second permanent magnet slot section 112 are disposed at two sides of the direct-axis of the rotor body 10 respectively. Such an arrangement can make the effects of conducting the magnetic induction lines better, thereby achieving a larger q-axis inductance.

In an embodiment, the first permanent magnet slot 11 further includes a second bent slot 114. A first end of the second bent slot 114 is connected to the second end of the second permanent magnet slot section 112, and a second end of the second bent slot 114 is arranged to extend toward the outer edge of the rotor body 10. A distance between a terminal end of the second bent slot 114 and the quadrature-axis of the rotor body 10 is less than a distance between the second end of the second permanent magnet slot section 112 and the quadrature-axis. Such an arrangement can make the effects of conducting the magnetic induction lines better, thereby achieving larger q-axis inductance.

The first bent slot 113 and the second bent slot 114 are arranged symmetrically relative to the direct-axis. Such an arrangement can better conduct the magnetic induction lines from the stator into each magnetic flux path more evenly.

In an embodiment, a second permanent magnet slot 12 includes a third permanent magnet slot section 121, a fourth permanent magnet slot section 122 and a fifth permanent magnet slot section 123 which are arranged sequentially. The third permanent magnet slot section 121, the fourth permanent magnet slot section 122 and the fifth permanent magnet slot section 123 are sequentially connected, forming a U-shaped structure with an opening facing the outer edge of the rotor body 10. Alternatively, the third permanent magnet slot section 121, the fourth permanent magnet slot section 122 and the fifth permanent magnet slot section 123 are sequentially arranged and spaced, and second magnetic barrier bridges are formed between adjacent two sections among the third permanent magnet slot section 121, the fourth permanent magnet slot section 122, and the fifth permanent magnet slot section 123 respectively. Such an arrangement enhances mechanical strength of the rotor.

As shown in FIG. 1, the third permanent magnet slot section 121 includes a third bent slot 124. A first end of the third bent slot 124 is connected to an end of the third permanent magnet slot section 121 adjacent to the outer edge of the rotor body 10, and a second end of the third bent slot 124 extends toward the outer edge of the rotor body 10 and gradually approaches the quadrature-axis. The fifth permanent magnet slot section 123 includes a fourth bent slot 125. A first end of the fourth bent slot 125 is connected to an end of the fifth permanent magnet slot section 123 adjacent to the outer edge of the rotor body 10, and a second end of the fourth bent slot 125 extends toward the outer edge of the rotor body 10 and gradually approaches the quadrature-axis. The bent slot of the permanent magnet slot is arranged to form an included angle, which can more effectively conduct the q-axis magnetic induction lines from the stator 40 into each magnetic flux path more evenly, thereby increasing the q-axis inductance of the motor, and increasing the reluctance torque of the motor.

Further, the third bent slot 124 and the fourth bent slot 125 are arranged symmetrically relative to the direct-axis. Such an arrangement can better conduct the magnetic induction lines from the stator into each magnetic flux path more evenly.

An extended portion of a side wall of the first bent slot 113 adjacent to the direct-axis and an extended portion of a side wall of the second bent slot 114 adjacent to the direct-axis form an included angle A1, and an extended portion of a side wall of the first permanent magnet slot section 111 adjacent to the direct-axis and an extended portion of a side wall of the second permanent magnet slot section 112 adjacent to the direct-axis form an included angle A, where $2 \times A \leq A1$. Such an arrangement can more effectively conduct the q-axis magnetic induction lines from the stator into each magnetic flux path more evenly.

In an embodiment, an extended portion of a side wall of the third bent slot 124 adjacent to the direct-axis and an extended portion of a side wall of the fourth bent slot 125 adjacent to the direct-axis form an included angle B1, and an extended portion of a side wall of the third permanent magnet slot section 121 adjacent to the direct-axis and an extended portion of a side wall of the fifth permanent magnet slot section 123 adjacent to the direct-axis form an included angle B, where $2 \times B \leq B1$. Such an arrangement can more effectively conduct the q-axis magnetic induction lines from the stator into each magnetic flux path more evenly.

Further, $1.1 \times B1 \leq A1$. Such an arrangement can better conduct the magnetic induction lines into each magnetic flux path more evenly.

In addition, the rotor structure also includes a first permanent magnet 20 and a second permanent magnet 30. The first permanent magnet 20 is disposed in the first permanent magnet slot 11, and the second permanent magnet 30 is disposed in the second permanent magnet slot 12. Such an arrangement optimizes the magnetic circuit of the rotor structure and enhances the magnetic forces of the rotor structure, thereby effectively improving the overall anti-demagnetization capability of the rotor structure.

In an embodiment, a fifth included angle $\alpha 1$ is formed between the direct-axis of the rotor body 10 and a straight line, which connects a cener of the rotation shaft hole of the rotor body and a point which is adjacent to the edge of the rotor body 10 and on a surface of the first permanent magnet 20 adjacent to the direct-axis side of the rotor body 10; a sixth included angle $\alpha 2$ is formed between the direct-axis of the rotor body 10 and a straight line, which connects the center of the rotation shaft hole of the rotor body and a point which is adjacent to the edge of the rotor body 10 and on a surface of the second permanent magnet 30 adjacent to the direct-axis side of the rotor body 10, and $1.3\times(\sin \alpha 1/\sin \alpha 2) \leq S1/S2 \leq 2\times(\sin \alpha 1/\sin \alpha 2)$, where S1 denotes an area of a surface of the first permanent magnet 20 adjacent to the direct-axis of the rotor body 10, and S2 denotes an area of a surface of the second permanent magnet 30 adjacent to the direct-axis of the rotor body 10. The arrangement for the distribution shape of the first permanent magnet as well as the arrangement for the ratio of the thickness of the first permanent magnet to the thickness of the second permanent magnet can adjust the working point of the permanent magnet better, so that the average working efficiency of the first and second permanent magnets becomes higher, and the ratio of the magnetic induction lines of the second permanent magnet entering the first permanent magnet to the magnetic induction lines of the second permanent magnet directly entering the stator 40 is more reasonable, thereby increasing the flux linkage of the permanent magnets of the motor, and improving the efficiency and power factor of the motor.

A thickness of at least part of the second permanent magnet 30 is greater than a thickness of the first permanent magnet 20. Such an arrangement makes the magnetic poles of the rotor to be evenly distributed in a circumference thereof.

Further, the thickness of the first permanent magnet 20 is M1, and the thickness of the second permanent magnet 30 is M2, where $1.1 M1 \leq M2 \leq 1.8 \times M1$. Such an arrangement makes the first and second permanent magnets have a consistent anti-demagnetization capability.

In an embodiment, the second permanent magnet slot 12 includes the third permanent magnet slot section 121 and the fifth permanent magnet slot section 123. The third permanent magnet slot section 121 includes a third bent slot 124, and the fifth permanent magnet slot section 123 includes a fourth bent slot 125. A width of a second end of the third bent slot 124 or a width of a second end of the fourth bent slot 125 is D2, or both the width of the second end of the third bent slot 124 and the width of the second end of the fourth bent slot 125 are D2, and $D2 \leq 0.6 \times M2$, where M2 denotes the thickness of the second permanent magnet 30. Such an arrangement can effectively increase the stator flux entering into the rotor, thereby improving the q-axis inductance of the motor.

In an embodiment, P denotes a midpoint of a straight line connecting a midpoint of the side wall of the first permanent magnet slot 11 adjacent to the rotation shaft hole of the rotor body 10 with a closet point in the edge of the rotor body 10. An arc is drawn in a circumferential direction of the rotor body 10 by taking the center of the rotor body 10 as a center and taking a distance from the center to the point P as a radius. Along the arc, the total sum of thicknesses of the first permanent magnet 20 and the second permanent magnet 30 is M3, and the circumference of the arc is C1, where $M3/C1=T2$, and $45\% \leq T2 \leq 70\%$. By setting the thickness of the permanent magnets to satisfy this range, the ratio of the thickness of the permanent magnets to the thickness of the magnetic flux path is in a better range, which not only ensures that the working point of the permanent magnet is higher to achieve a larger anti-demagnetization capability and higher no-load flux linkage of the motor, but also enables the motor to achieve a larger inductance difference between the quadrature-axis and the direct-axis, thereby improving the reluctance torque of the motor.

In an embodiment, L denotes a length of a surface of the first permanent magnet 20 disposed in the first permanent magnet slot section 111 or in the second permanent magnet slot section 112, wherein the surface of the first permanent magnet is adjacent to the direct-axis, and C denotes a maximum width between the first permanent magnet slot section 111 and the second permanent magnet slot section 112, where $0.8 \times C \leq L$. In such an arrangement, more permanent magnets can be arranged in a same rotor, thereby improving the efficiency and anti-demagnetization capability of the motor.

In an embodiment, a width of the magnetic flux path 13 gradually increases outward in a radial direction of the rotor body 10, alternatively, the width of the magnetic flux path 13 gradually smoothly decreases outward in the radial direction of the rotor body 10, alternatively the width of the magnetic flux path 13 is gradually increase outward in the radial direction of the rotor body 10 within a preset distance and then gradually decreases, alternatively the width of magnetic flux path 13 is gradually decreases outward in the radial direction of the rotor body 10 within a preset distance and then gradually increases. In this way, more magnetic induction lines from the stator 40 enter the magnetic flux path, so that the rotor can obtain a larger reluctance torque, thereby improving the working efficiency of the rotor.

Multiple permanent magnet slot groups are provided and evenly arranged around the rotor body 10. In this way, the rotor magnetic poles are evenly distributed on the circumference, thus making the motor magnetic poles to be symmetrically distributed, reducing torque ripples when the motor is loaded, and reducing vibration and noise of the motor.

In an embodiment, the number of at least one of the second permanent magnet slot 12 and the first permanent magnet slot 11 is plural. Such an arrangement enhances the magnetic forces of the rotor structure, so that the overall anti-demagnetization capability of the rotor structure is effectively improved, thereby improving the working efficiency of the rotor, and effectively improving the working efficiency of the motor having the rotor structure.

In accordance with another aspect of the present disclosure, a permanent magnet auxiliary synchronous reluctance motor is provided. The motor includes a rotor structure, and the rotor structure is any one of the rotor structures in the foregoing embodiments.

The rotor structures in the above embodiments can also be applied in the technical field of vehicle equipment, that is, in accordance with another aspect of the present disclosure, an electric vehicle is provided. The electric vehicle includes a rotor structure, and the rotor structure is the rotor structure described above.

Figure 3:
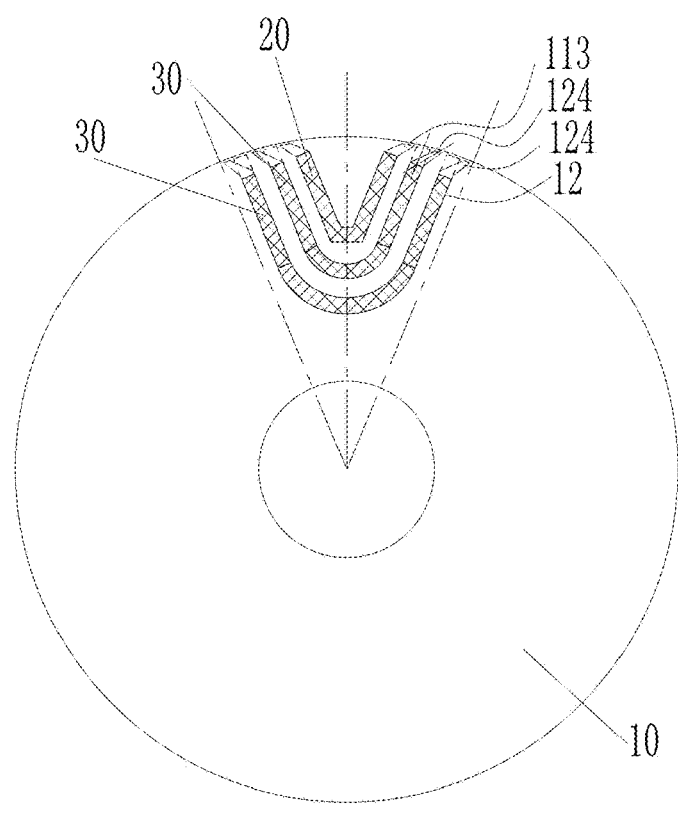
FIG. 3 shows a schematic structure diagram of the rotor structure in accordance with a third embodiment of the present disclosure.
Figure 4:
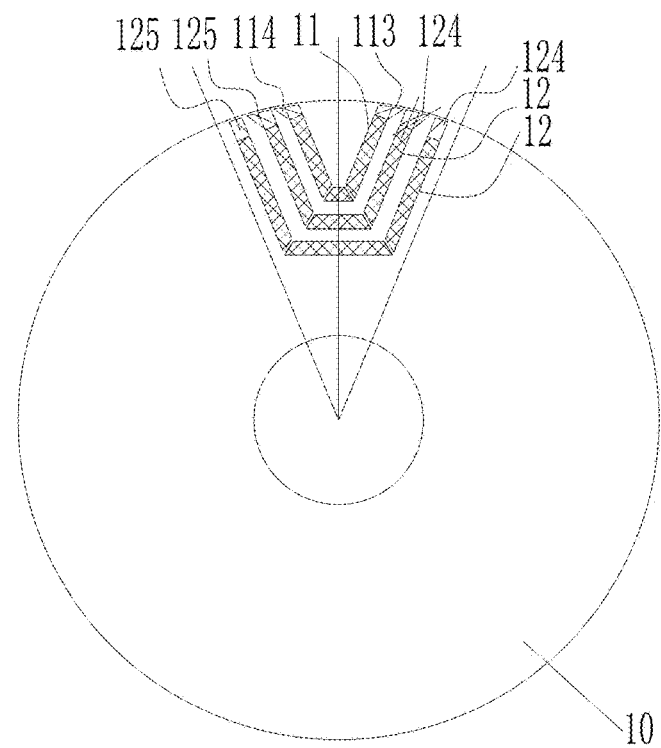
FIG. 4 shows a schematic structure diagram of the rotor structure in accordance with a fourth embodiment of the present disclosure.

In an embodiment, the motor includes a stator structure and a rotor structure. The stator structure includes a stator core and windings embedded in the stator core. The rotor structure includes permanent magnet slots and permanent magnets arranged in the permanent magnet slots. A same magnetic pole of the rotor is provided with multiple layers of permanent magnets. The term "multiple layers" in this solution means that the number of layers is greater than or equal to two. The permanent magnets in the same magnetic pole have the same polarity toward the stator 40. The permanent magnet slot is in a shape of a protrusion toward an inner side of the rotor. Two ends of the permanent magnet slot are adjacent to the outer circle of the rotor, and the center of the permanent magnet slot is adjacent to the inner side of the rotor. As shown in FIG. 1 and FIG. 3, a magnetic flux path is formed between any two adjacent permanent magnet slots in the same magnetic pole, and an end of one or more magnetic flux paths each has a bent section bending towards the second permanent magnet.

As shown in FIG. 1, the magnetic flux path 13 includes a first sub-segment 131, a second sub-segment 132 and a third sub-segment 133 which are connected sequentially. A first end of the first sub-segment 131 is arranged toward the rotation shaft hole of the rotor body 10, and a second end of the first sub-segment 131 is arranged to extend toward the outer edge of the rotor body 10. A first end of the third sub-segment 133 is arranged toward the rotation shaft hole of the rotor body 10, and a second end of the third sub-segment 133 is arranged to extend toward the outer edge of the rotor body 10. The first sub-segment 131 and the third sub-segment 133 are arranged at two sides of the direct-axis. A distance from the first sub-segment 131 to the direct-axis gradually increases outwards in the radial direction of the rotor body 10. In this way, the q-axis magnetic induction lines f are effectively conducted, thus more magnetic flux is generated by the same exciting current, thereby improving the q-axis inductance of the motor, increasing the reluctance torque of the motor, and improving the efficiency and power density of the motor.

In an embodiment, the third sub-segment 133 includes a first straight segment 134 and a second straight segment 135. A first end of the first straight segment 134 is connected to the second sub-segment 132. A first end of the second straight segment 135 is connected to a second end of the first straight segment 134, and a second end of the second straight segment 135 extends along the outer edge of the rotor body 10 and gradually approaches the quadrature-axis. A first included angle is formed between a geometric center line of the first straight segment 134 and an extended geometric center line of the second straight segment 135. In this way, the magnetic induction lines can be conducted into the magnetic flux path conveniently and efficiently.

The first straight segment 134 is the same width as the second straight segment 135. In this way, the magnetic induction lines can be better conducted into each magnetic flux path more evenly.

In an embodiment, the first sub-segment 131 includes a third straight segment 136 and a fourth straight segment 137. A first end of the third straight segment 136 is connected to the second sub-segment 132, and a second end of the fourth straight segment 137 is connected to a second end of the third straight segment 136, and a second end of the fourth straight segment 137 is extends along the outer edge of the rotor body 10 and gradually approaches the quadrature-axis. A second included angle is formed between a geometric center line of the third straight segment 136 and an extended geometric center line of the fourth straight segment 137. In this way, the magnetic induction lines can be conducted into the magnetic flux path conveniently and efficiently.

Figure 19:
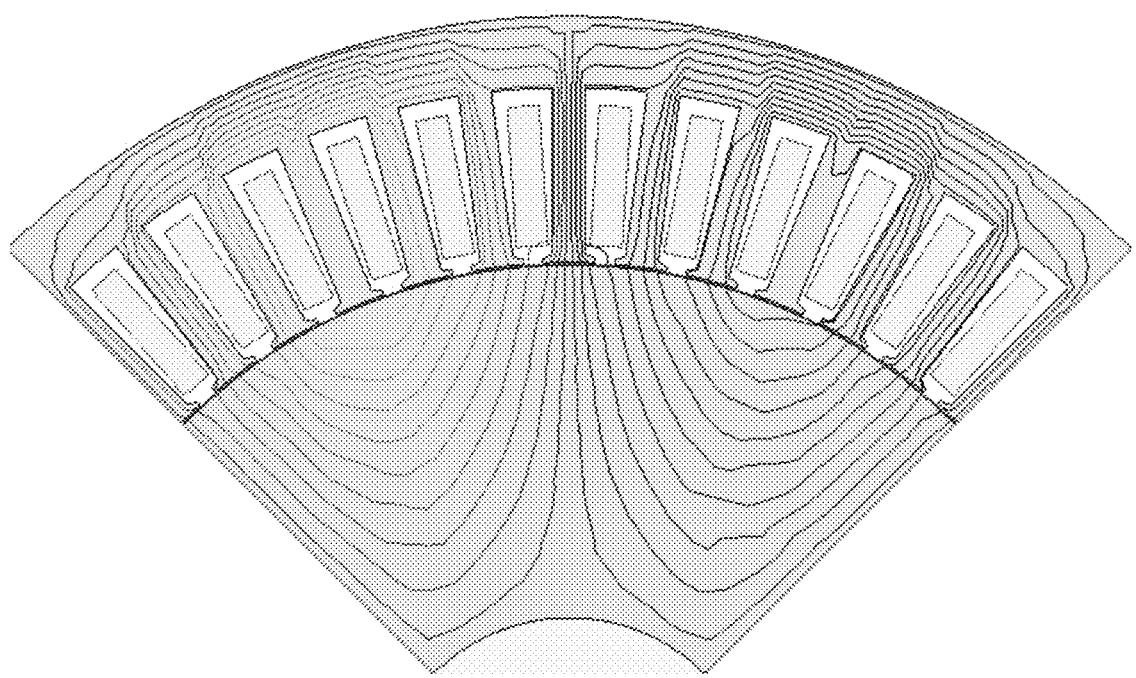
FIG. 19 is a schematic diagram illustrating a distribution of the q-axis magnetic induction in accordance with the rotor structure of the present disclosure.

As shown in FIG. 19, the permanent magnet auxiliary synchronous reluctance motor generates reluctance torque by means of the inductance difference between the quadrature-axis and the direct-axis, and generates permanent magnet torque by means of the permanent magnets. The reluctance torque of the motor can be increased by means of increasing the quadrature-axis inductance of the motor and decreasing the direct-axis inductance of the motor, and the permanent magnet torque of the motor can be increased by increasing the no-load flux linkage of the motor. The study found that when three-phase symmetrical alternating current flows through the stator 40 of the motor, the distribution of the magnetic induction lines in each tooth of the stator 40 is uneven. The closer a location is to the boundary line, the more magnetic induction lines are distributed at the location in the teeth of the stator 40.

Figure 7:
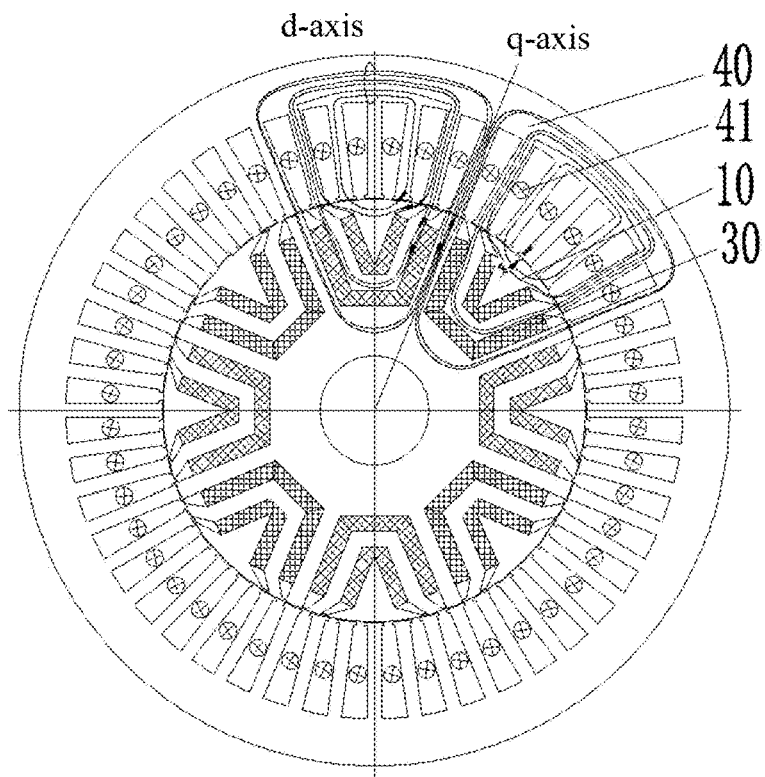
FIG. 7 is a schematic diagram illustrating paths of q-axis magnetic induction lines in accordance with a seventh embodiment of the rotor structure of the present disclosure.
Figure 8:
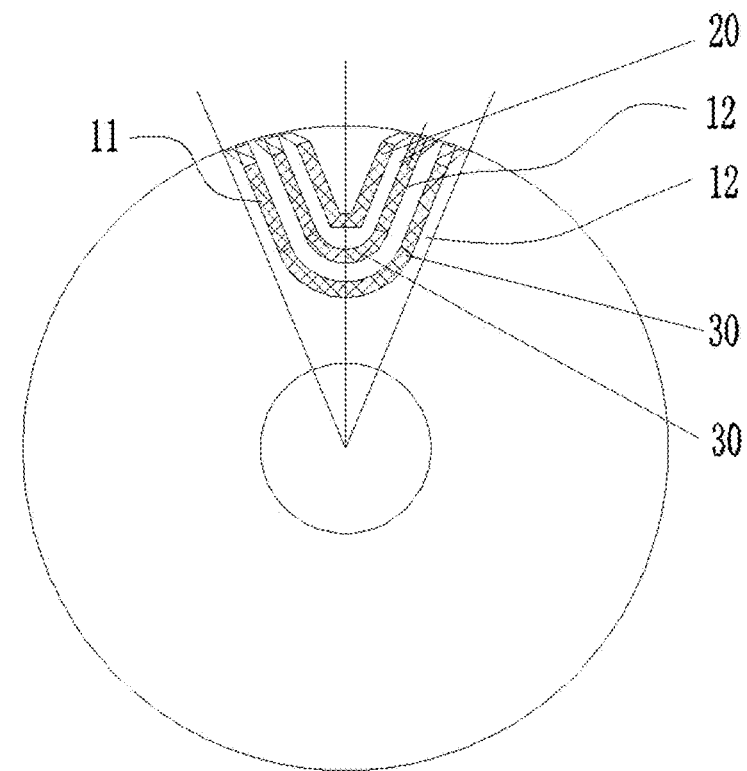
FIG. 8 shows a schematic structure diagram of the rotor structure in accordance with an eighth embodiment of the present disclosure.
Figure 9:
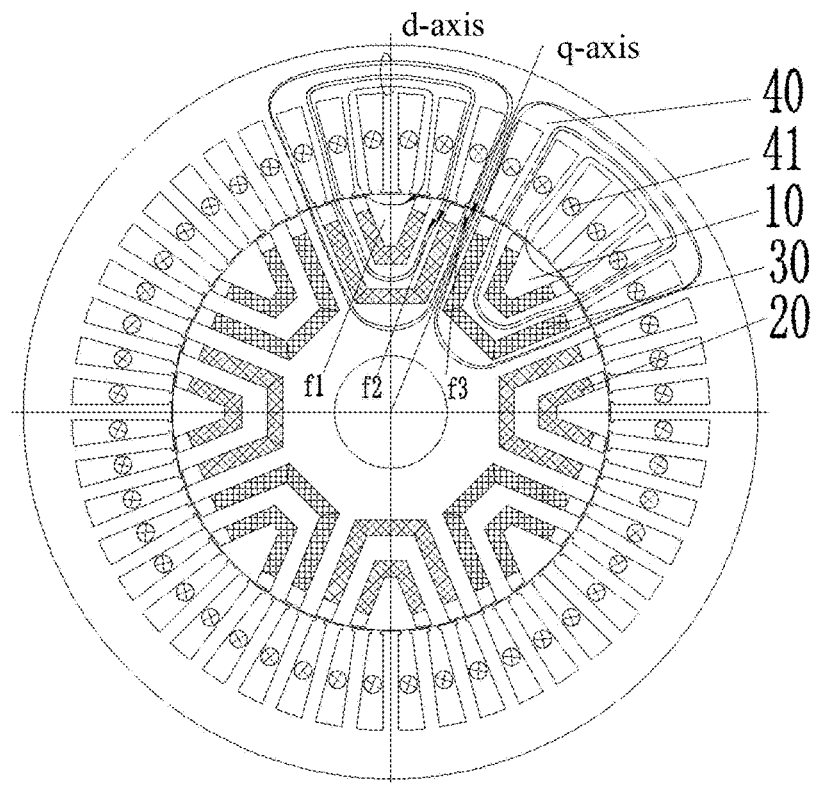
FIG. 9 is a schematic diagram illustrating paths of the q-axis magnetic induction lines in accordance with an embodiment of the prior art.
Figure 10:
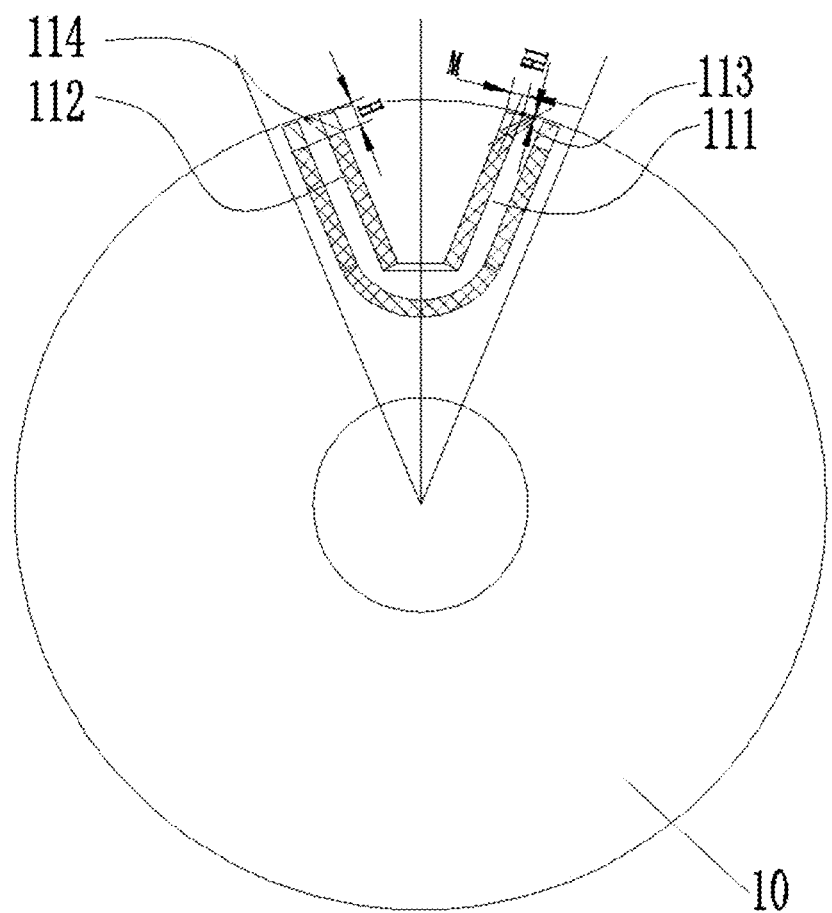
FIG. 10 shows a schematic structure diagram of the rotor structure in accordance with a ninth embodiment of the present disclosure.

As shown in FIG. 9, a schematic diagram illustrating the distribution of the q-axis magnetic induction lines of an existing permanent magnet auxiliary synchronous reluctance motor provided with two layers of permanent magnets, the q-axis magnetic induction lines from the stator teeth enter three magnetic flux paths respectively. A magnetic flux path f3 is formed between two innermost layers of permanent magnet slots of adjacent two magnetic poles; a magnetic flux path f2 is formed between the innermost layer permanent magnet slot and a second layer permanent magnet slot; and a magnetic flux path f1 is formed in a magnetic conduction region between the second layer permanent magnet slot and the outer circle of the rotor. Due to the uneven distribution of the magnetic induction lines in the stator teeth, most of the magnetic induction lines enter the magnetic flux path f3, and least of the magnetic induction lines enter the magnetic flux path f1. The magnetic circuits of the magnetic flux path f3 and the magnetic flux path f2 are relatively saturated. When the motor load is larger, the q-axis inductance of the motor will be greatly reduced, thus affecting the usage of the reluctance torque of the motor. This phenomenon becomes more serious especially for a ferrite permanent magnet auxiliary synchronous reluctance motor, which is in a case that, in order to improve the efficiency and anti-demagnetization capability of the motor, the permanent magnet is thicker, and it is difficult to increase the width of the magnetic flux path. Based on this, in the present solution, an end of the magnetic flux path bends towards the second permanent magnet. The distribution of the q-axis magnetic induction lines f of the motor is shown in FIG. 7. By providing the end of the magnetic flux path with a bent segment bending towards an inner layer permanent magnet slot, the q-axis magnetic induction lines f from the stator can be effectively conducted, and the magnetic induction lines which originally enter the high magnetic saturation area, such as the magnetic induction lines originally entering the magnetic channel f2 shown in the figure, are conducted into the low magnetic saturation area like the magnetic channel f1 shown in the figure. Accordingly, more magnetic flux is generated by the same exciting current, thereby improving the q-axis inductance of the motor, increasing the reluctance torque of the motor, and improving the efficiency and the power density of the motor.

Figure 11:
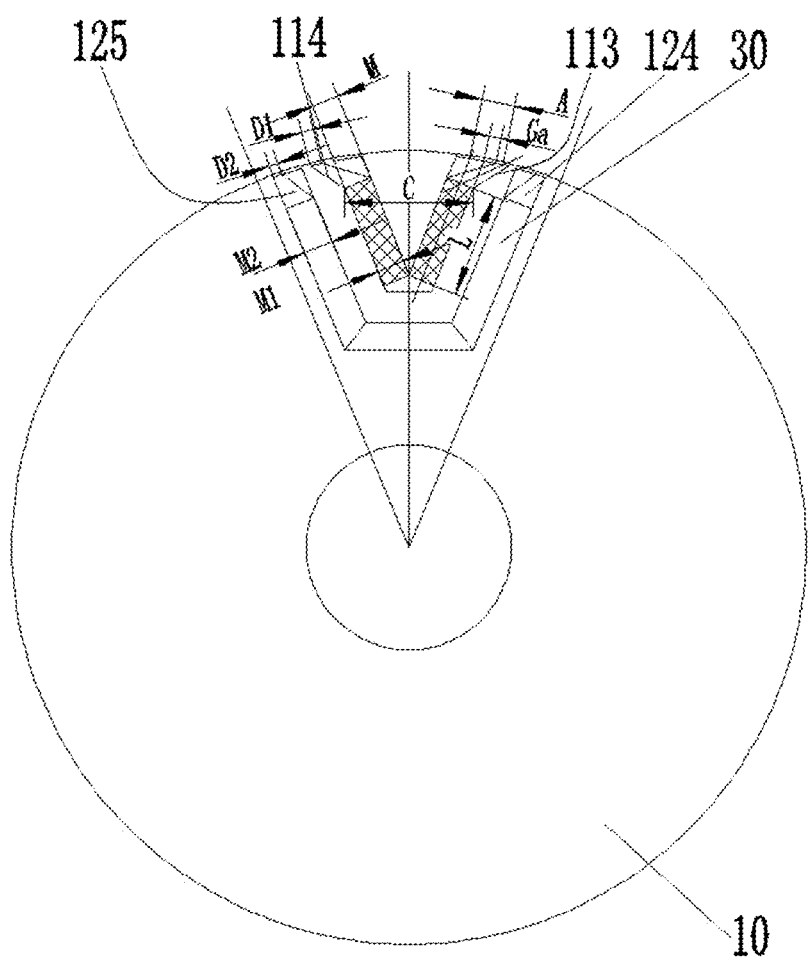
FIG. 11 shows a schematic structure diagram of the rotor structure in accordance with a tenth embodiment of the present disclosure.
Figure 12:
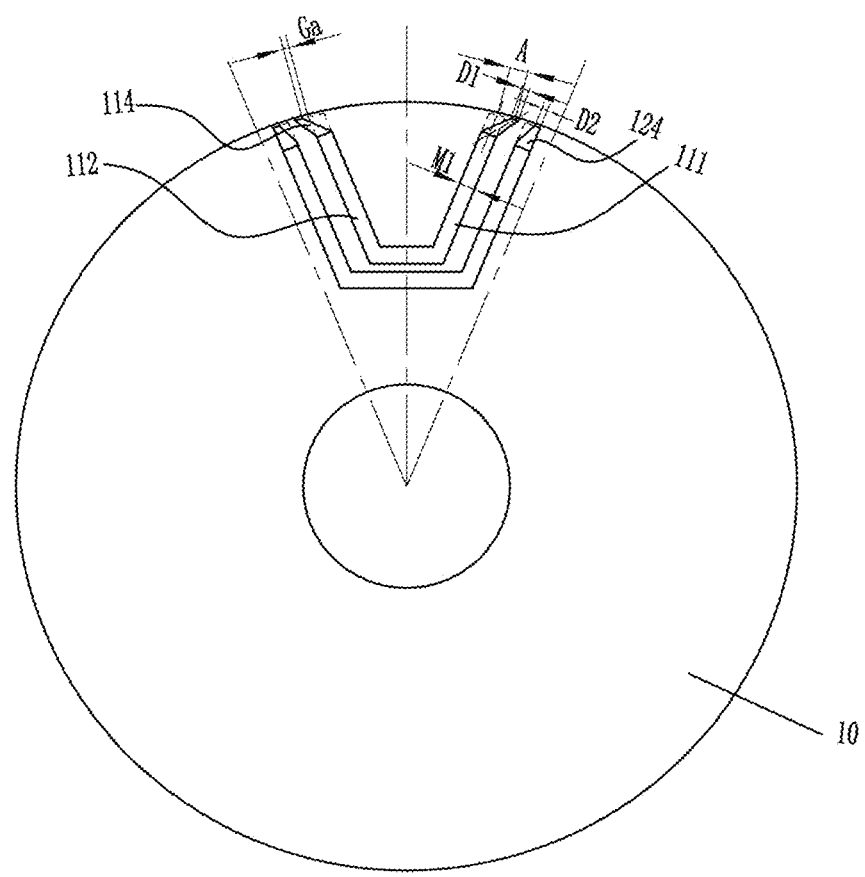
FIG. 12 is a schematic diagram illustrating a structure of a permanent magnet slot in accordance with the rotor structure of the present disclosure.
Figure 13:
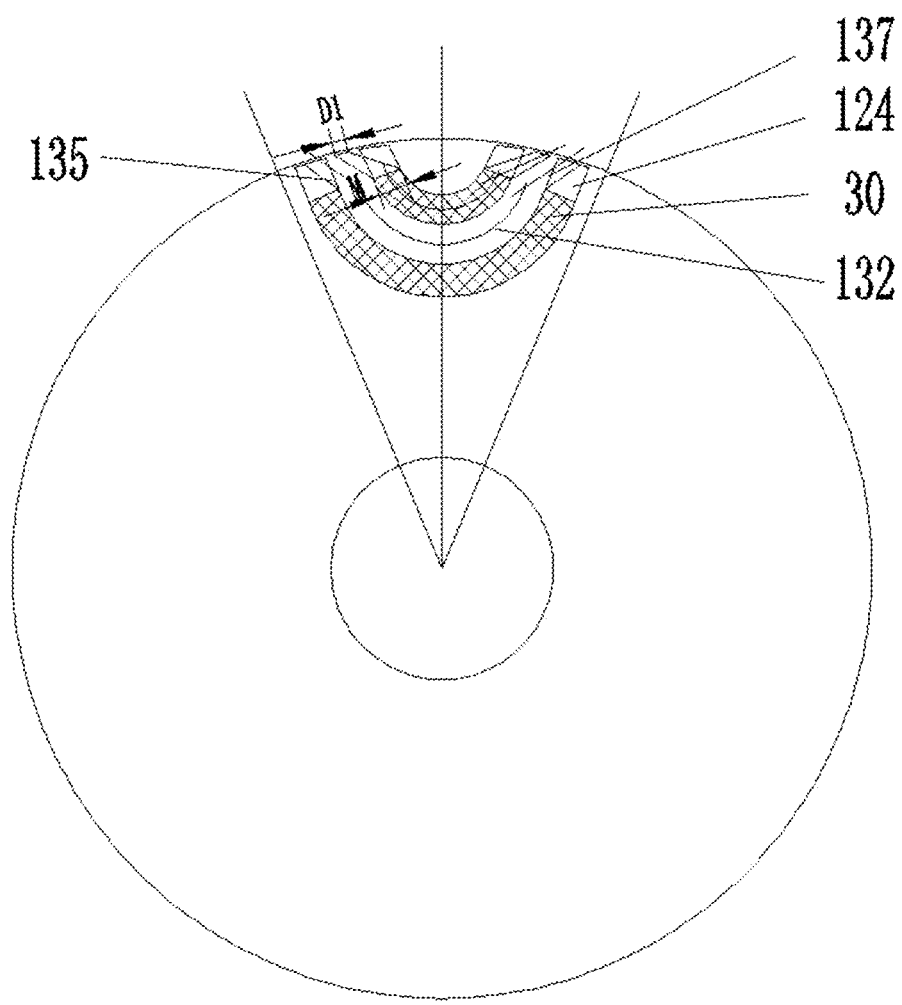
FIG. 13 shows a schematic structure diagram of the rotor structure in accordance with an eleventh embodiment of the present disclosure.
Figure 14:
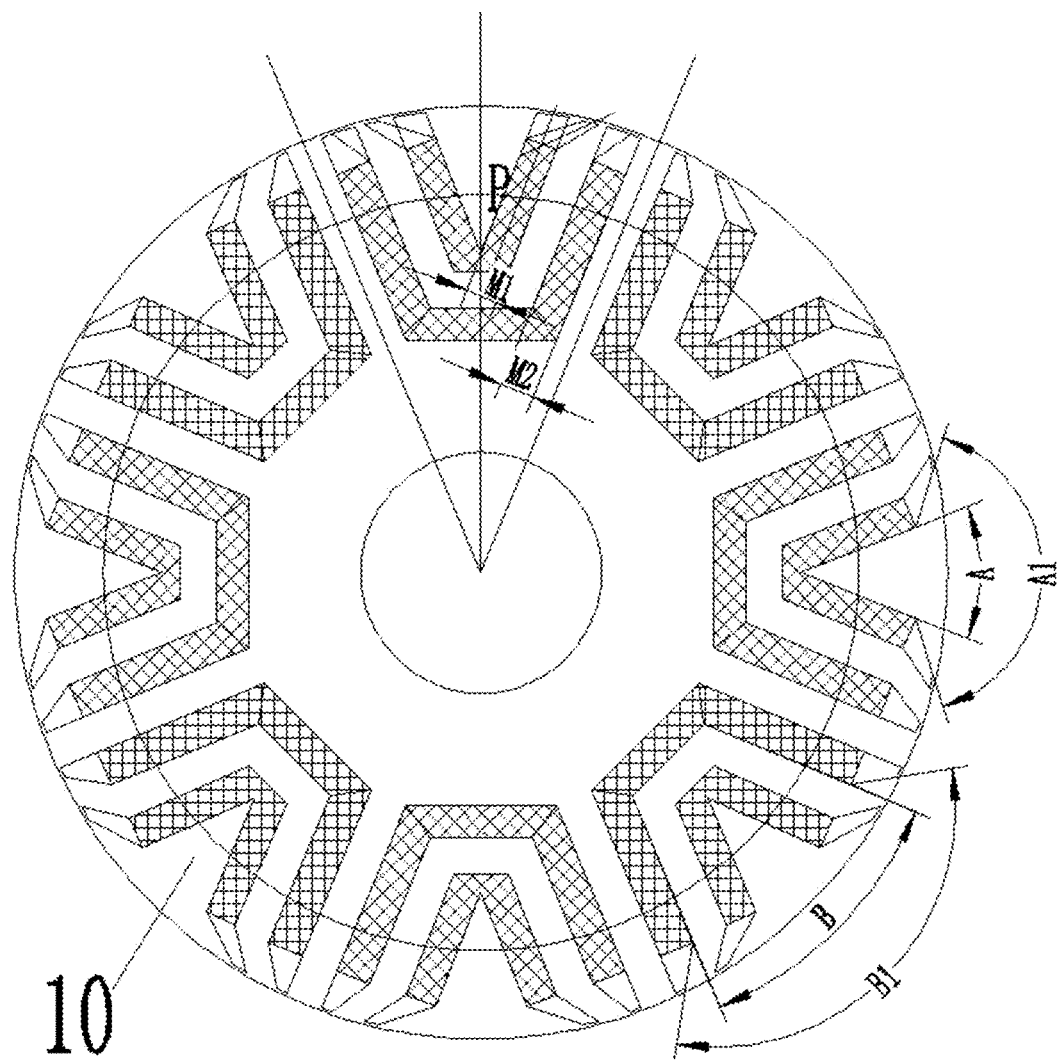
FIG. 14 shows a schematic cross-sectional structure diagram of the rotor structure in accordance with a twelfth embodiment of the present disclosure.

In addition, the second permanent magnet of the rotor is regarded as the first layer, the end of the second layer permanent magnet slot calculated from an inner side to an outer side is provided with a bent section bending towards the end of the inner layer permanent magnet slot, as shown in FIG. 11. By providing the bent section at the end of the permanent magnet slot, the magnetic induction lines from the stator can better conducted into each magnetic flux path more evenly.

Further, the width of the bent section provided at the end of the permanent magnet slot gradually increases from the outer surface to the inner side of the rotor. By setting the width of the bent section of the permanent magnet slot to be narrow outside and wide inside, on one hand, an inlet width of the magnetic flux path f2 becomes smaller after the permanent magnet slot bends, thereby resulting in a decrease in the q-axis magnetic flux; on the other hand, the magnetic induction lines originally entering the magnetic flux path f2 are, instead, better conducted into the magnetic flux path f3 of the rotor.

As shown in FIGS. 10 to 14, in order to better conduct the magnetic induction lines into the low saturated magnetic flux path other than the high saturated magnetic flux path, $0.6 \times M \leq A$ is satisfied, where A denotes a distance between a midpoint of an end edge of the bent second layer permanent magnet slot and a midpoint of an end edge of the pre-bending second layer permanent magnet slot, and M denotes the width of the unbent section of the second layer permanent magnet slot adjacent to the end of the rotor. The shape of the end of the pre-bending flux path is determined by the following method: when a flat permanent magnet is installed in the permanent magnet slot, two side edges of the permanent magnet slot are extended, and a distance between an outer edge of the permanent magnet slot adjacent to the outer edge of the rotor and the outer circle of the rotor is identical with the distance between an outer edge of the bent permanent magnet slot adjacent to the outer edge of the rotor and the outer circle of the rotor; when an arc-shaped permanent magnet is installed in the permanent magnet slot, tangent lines at the end points of the arc-shaped permanent magnet slot are extended, and a distance between an outer edge of the permanent magnet slot adjacent to the outer edge of the rotor and the outer circle of the rotor is identical with the distance between an outer edge of the bent permanent magnet slot adjacent to the outer edge of the rotor and the outer circle of the rotor. By controlling the deflection amplitude of the end of the permanent magnet slot and setting A to be equal to or greater than 0.6M, better effects of conducting the magnetic induction lines can be achieved, thereby achieving larger q-axis inductance.

In an embodiment, compared with an inner side end point of the terminal edge of the pre-bending second layer permanent magnet slot, an outer side end point of the terminal edge of the bent second layer permanent magnet slot is closer to the q-axis of the rotor. In this way, better effects of conducting the magnetic induction lines can be achieved.

Further, Ga denotes a distance between the end point of the end edge of the bent second layer permanent magnet slot adjacent to the outer side and the end point of the end edge of the pre-bending second layer permanent magnet slot adjacent to the inner side, and the distance Ga is approximately an integer multiple of an air gap length g between the stator and the rotor. By setting the distance Ga to be approximately the integer multiple of the air gap length g between the stator and the rotor, the content of the harmonic magnetic field in the air gap can be effectively reduced, thereby reducing the harmonic loss and the torque ripples of the motor, the range herein is from 0.95 times to 1.05 times.

Further, the length of the bent section at the end of the second layer permanent magnet slot is H−H1, and the width of the end of the unbent section of the permanent magnet slot is M, and $0.4 \times M \leq (H-H1)$ is satisfied. Where H denotes the distance from the outer edge of the bent section of the permanent magnet slot to the outer circle of the rotor, H1 denotes the thickness of the magnetic barrier bridge formed between the bent section of the permanent magnet slot of the rotor and the outer circle of the rotor, and M denotes the width of the end of the unbent section of the permanent magnet slot.

Figure 15:
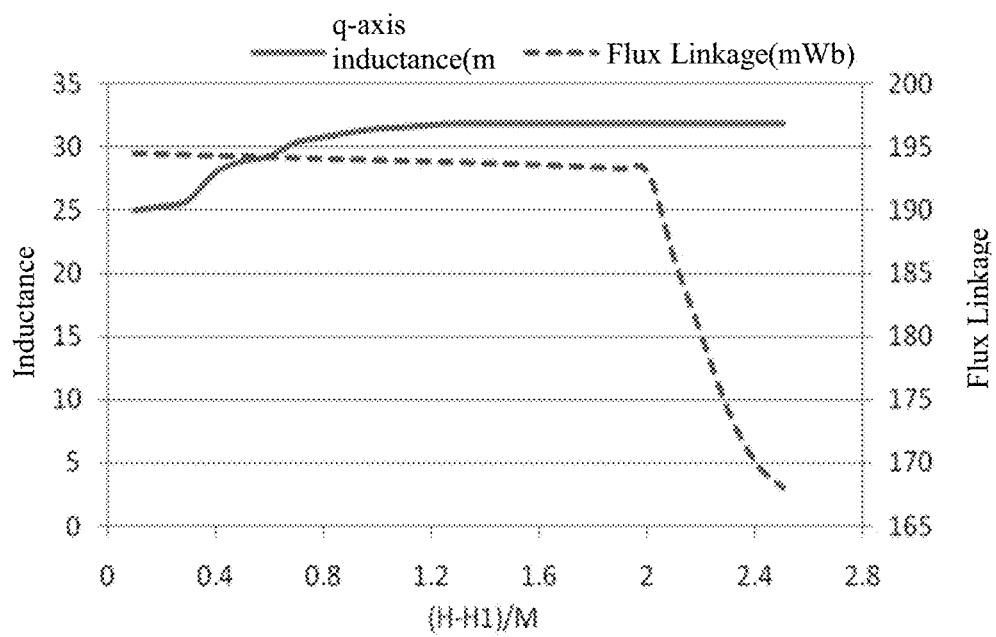
FIG. 15 is a schematic diagram illustrating effects of a length of a bent slot at an end of the permanent magnet slot of the rotor structure on performances of a motor.

As shown in FIG. 15, the study found that the length of the bent section of the permanent magnet slot has a greater effect on the q-axis inductance and the flux linkage of the motor. When $0.4 \times M \leq (H-H1)$, the q-axis inductance can be significantly improved, but if (H−H1) is greater than 2×M, magnetic flux area the second layer permanent magnet will decrease, which will result in a decrease in the no-load flux linkage of the motor. Therefore, preferably, $0.4 \times M \leq (H-H1) \leq 2 \times M$.

Figure 5:
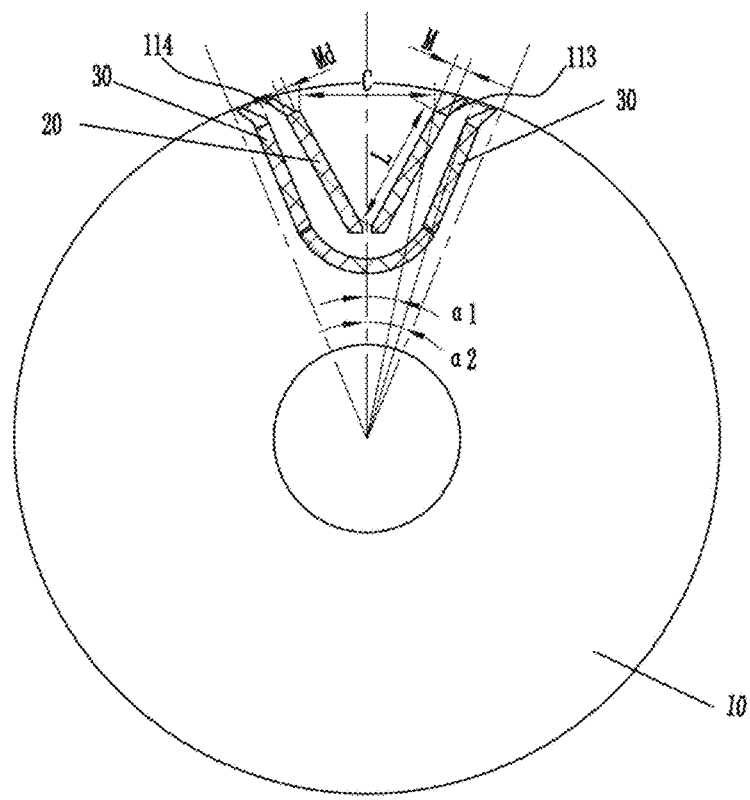
FIG. 5 shows a schematic structure diagram of the rotor structure in accordance with a fifth embodiment of the present disclosure.
Figure 6:
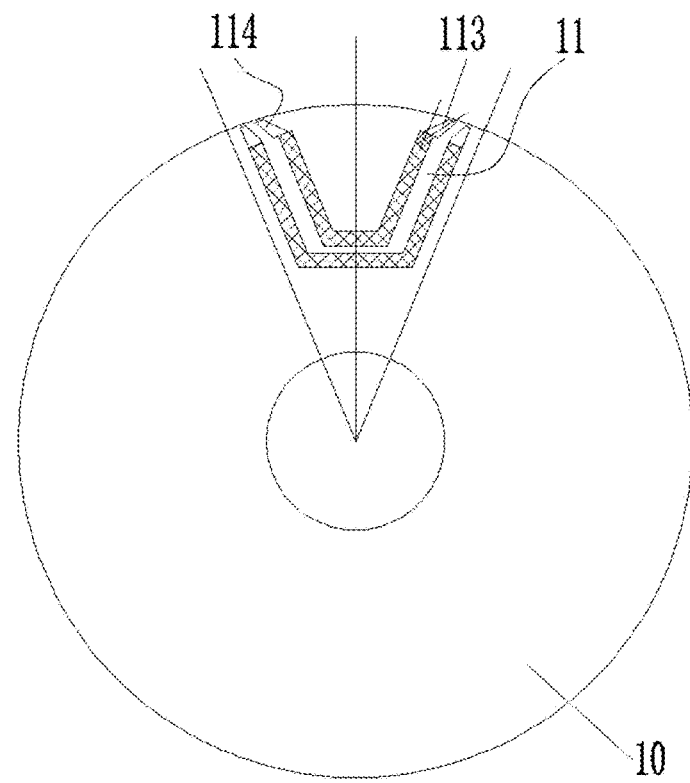
FIG. 6 shows a schematic structure diagram of the rotor structure in accordance with a sixth embodiment of the present disclosure.

As shown in FIG. 5, in order to better fix the permanent magnet, the width Md of an end of the bent section of the second layer permanent magnet slot, which is adjacent to the inner side of the rotor, is smaller than the width M of the terminal end of the unbent section of the permanent magnet slot. The width D1 of the terminal end of the bent section of the second layer permanent magnet slot is smaller than the width M of the terminal end of the unbent section of the second layer permanent magnet slot, and $0.25 \times M \leq D1 \leq 0.8 \times M$, preferably, $0.3 \times M \leq D1 \leq 0.45 \times M$.

Figure 16:
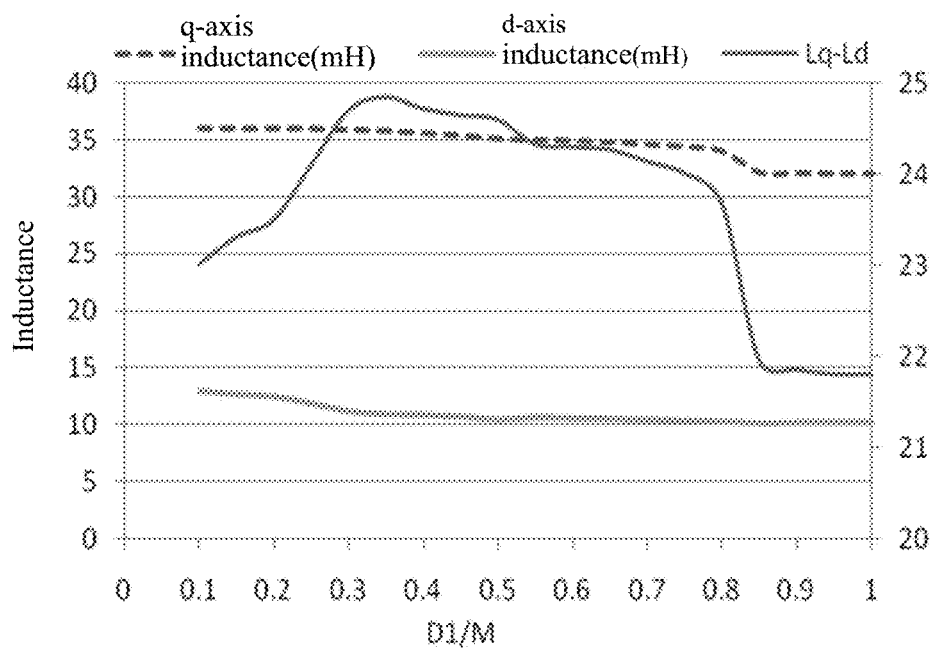
FIG. 16 is a schematic diagram illustrating effects of a width of an end of the bent slot of the rotor structure on parameters of the motor.
Figure 17:
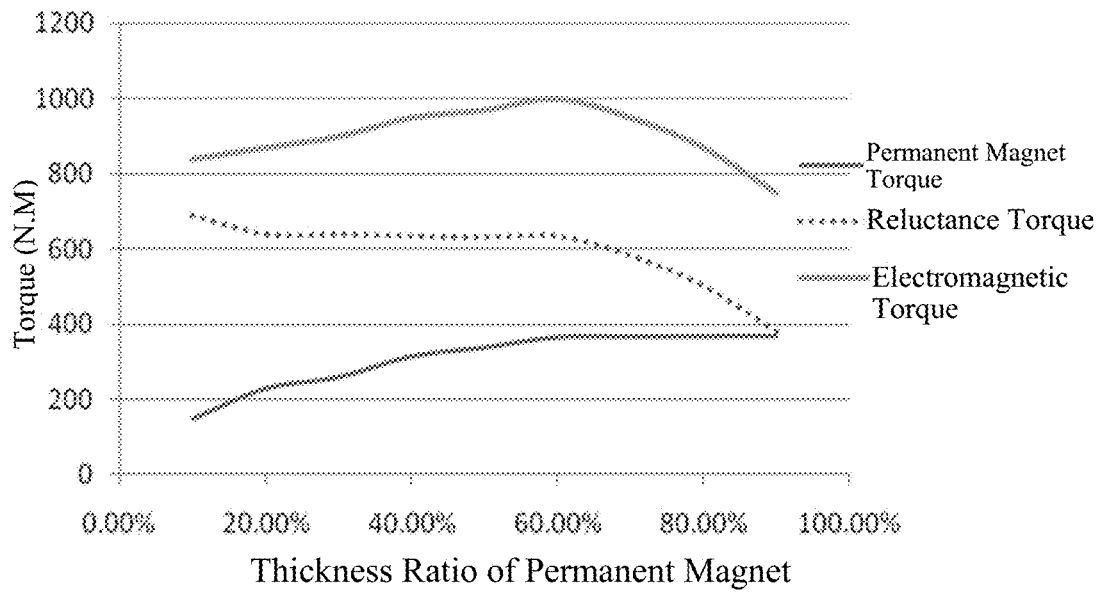
FIG. 17 is a schematic diagram illustrating a relationship between a proportion of thicknesses of permanent magnets of the rotor structure and a torque.
Figure 18:
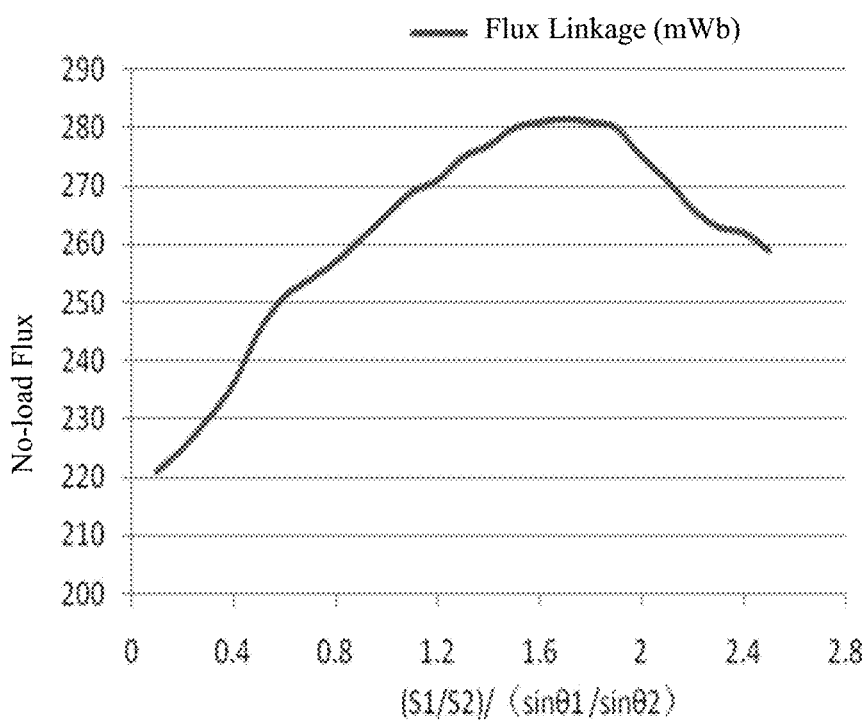
FIG. 18 is a schematic diagram illustrating effects of an area ratio of a first permanent magnet slot to a second permanent magnet slot of the rotor structure on flux linkage.

The study found that the width D1 of the terminal end of the bent section of the permanent magnet slot has a certain effect both on the quadrature-axis inductance and the direct-axis inductance of the motor. As shown in FIG. 16, when the width D1 is greater than 0.8×M, the terminal end of the permanent magnet slot has greater reluctance to the q-axis flux, thus resulting in a decrease in the q-axis inductance. If the width D1 is less than 0.25×M, the magnetic induction lines of the d-axis inductance can easily pass through the magnetic barrier bridge between the permanent magnet slot and the outer circle of the rotor. In order to achieve a greater inductance difference between the quadrature-axis inductance and the direct-axis inductance and improve the reluctance torque of the motor, $0.25 \times M \leq D1 \leq 0.8 \times M$ is satisfied. Further, $0.3 \times M \leq D1 \leq 0.45 \times M$. In addition, no permanent magnet is arranged in the bent section at the terminal end of the permanent magnet slot, which can effectively slow down the local demagnetization at the terminal end of the permanent magnet and improve the anti-demagnetization ability of the motor.

Further, the number of permanent magnet layers is two or three layers. By setting the number of the permanent magnet layers to be two or three layers, the reluctance torque of the motor can be increased, and a decrease in the operating points of a single-layer permanent magnet caused by too many layers of permanent magnets can be avoided as well, thereby improving the efficiency and the anti-demagnetization capability of the motor.

The permanent magnets of the motor rotor are ferrite permanent magnets. An arc is drawn by taking the center of the rotor namely the rotation shaft hole as a center, and the arc passes through a midpoint P of an outer edge of the first permanent magnet. Along the arc, the total sum of thicknesses of the permanent magnets of the rotor accounts for 45%-70% of the circumference of the arc. When the permanent magnets of the motor rotor are ferrite permanent magnets, by setting the thicknesses of the permanent magnets to be within this range, the ratio of the thickness of the permanent magnet to the thickness of the magnetic flux path is in a better range, which can ensure that the working points of the permanent magnets are higher, thereby achieving larger anti-demagnetization capability and higher no-load flux linkage of the motor. Moreover, the motor can achieve a larger inductance difference between the quadrature-axis and the direct-axis, thereby improving the reluctance torque of the motor. Preferably, along the arc, the total sum of thicknesses of the permanent magnets of the rotor accounts for 55%-65% of the circumference of the arc.

In an embodiment, in order to enhance the mechanical strength of the rotor, one or more magnetic barrier bridges are formed in each layer permanent magnet slot. In addition, the inner layer permanent magnet slot is provided with flat permanent magnets at two ends adjacent to the outer circle of the rotor, and the second layer permanent magnet slot is provided with flat permanent magnets at ends adjacent to the outer circle of the rotor. By providing flat permanent magnets at the ends of the permanent magnet slot, more permanent magnets can be arranged in the same rotor, thereby improving the efficiency and the anti-demagnetization capability of the motor.

Further, two layers of rotor permanent magnets are provided. The first permanent magnet slot is substantially V-shaped. L denotes a length of the permanent magnet disposed in a side of the V-shaped permanent magnet slot, and C denotes a maximum width of the V-shaped permanent magnet, and $0.8 \times C \leq L$ is satisfied. The first permanent magnet slot is substantially U-shaped and includes at least three segments of permanent magnets. The ratio of a surface area of the first permanent magnet adjacent to the outer side of the rotor to a surface area of the second permanent magnet adjacent to the outer side of rotor is S1/S2. An angle formed by terminal end points of two sides of the first permanent magnet adjacent to the outer circle of the rotor, relative to the center of the rotor is $2 \times \alpha 1$, and an angle formed by terminal end points of two sides of the second permanent magnet adjacent to the outer circle of the rotor, relative to the center of the rotor is $2 \times \alpha 2$, the following relationship is satisfied: $1.3 \times (\sin \alpha 1 / \sin \alpha 2) \leq S1/S2 \leq 2 \times (\sin \alpha 1 / \sin \alpha 2)$.

By setting the shape of the first permanent magnet and the area ratio of the inner layer permanent magnet to the first permanent magnet, the working points of the permanent magnet can be better adjusted, so that the average working point of the first and second permanent magnets becomes higher, the ratio of the magnetic induction lines of the second permanent magnet entering the first permanent magnet to the magnetic induction lines of the second permanent magnet directly entering the stator 40 is more reasonable. Accordingly, the permanent magnet flux linkage of the motor is increased, thereby improving the efficiency and the power factor of the motor. The effects of the ratio of the surface area of the first permanent magnet to the surface area of the second permanent magnet on the flux linkage of the motor are shown in the figure. By setting the ratio of the surface area of the first permanent magnet to the surface area of the second permanent magnet to satisfy: $1.3 \times (\sin \alpha 1 / \sin \alpha 2) \leq S1/S2 \leq 2 \times (\sin \alpha 1 / \sin \alpha 2)$, a larger no-load flux linkage of the motor can be achieved. Preferably, $1.5 \times (\sin \alpha 1 / \sin \alpha 2) \leq S1/S2 \leq 1.8 \times (\sin \alpha 1 / \sin \alpha)$.

In an embodiment, the thickness M2 of the plate permanent magnets disposed at two sides of the innermost layer of the rotor is greater than the thickness M1 of the plate permanent magnets disposed at the ends of the second layer, and $1.1 M1 \leq M2 \leq 1.8 M1$ is satisfied. The study found that when a directional magnetic field is applied to the stator 40, the working point of the first permanent magnets and the working point of the second permanent magnets are different, and the working point of the second permanent magnet is lower than that of the first permanent magnet, which makes the second permanent magnet more prone to local demagnetization, thus affecting the overall anti-demagnetization capability of the motor. In order to alleviate this phenomenon, the thickness M2 of the second permanent magnet is designed to be greater than the thickness M1 of the first permanent magnet. In order to make the inner layer permanent magnet and the first permanent magnet have the same anti-demagnetization capability, $1.1 \times M1 \leq M2 \leq 1.8 \times M1$ is satisfied. Preferably, $1.1 \times M1 \leq M2 \leq 1.3 \times M1$.

A magnetic flux path formed by the inner layer permanent magnet and the first rectangular permanent magnet has a variable width, and the width of part of the magnetic flux path adjacent to the outer surface of the rotor is smaller. By configuring the width the magnetic flux path to be gradually reduced, the magnetic flux areas of the inner layer permanent magnet and the first permanent magnet can be better adjusted to achieve adjustment for consistency of the working points of the inner layer permanent magnet and the first permanent magnet.

In an embodiment, A1 denotes an included angle formed by the outer side edges of the bent sections of the first permanent magnet slot, and A denotes an included angle formed by the outer side edges of the unbent sections of the first permanent magnet slot, where $2 \times A \leq A1$. The outer surfaces of the ends of the second permanent magnet slot have cut edges. B1 denotes an included angle formed by the outer side edges of the sections with cut edges of the second permanent magnet slot, and B denotes an included angle formed by the outer side edges of the sections without cut edges of the permanent magnet slot, where $2 \times B \leq B1$, and $1.1 \times B1 \leq A1$. By setting the included angle between the outer side edges of the bent sections and the included angle between the outer side edges of the unbent sections of the permanent magnet slot, the q-axis flux linkage from the stator can be more effectively conducted into each magnetic flux path, thereby increasing the q-axis inductance of the motor, and improving reluctance torque of the motor. The outer surface of the end of the permanent magnet slot of the rotor has a cut edge. D1 denotes a width of the end of the chamfered section of the permanent magnet slot, and D2 denotes the width of the end of the uncut section of the permanent magnet slot, where $D1 \leq 0.6 \times D2$. The width of the end of the second permanent magnet slot is reduced by means of the cut edge, thereby effectively increasing the magnetic flux entering the rotor from the stator, and improving the q-axis inductance of the motor. The end of the second permanent magnet slot has a bent section bending towards the pole boundary, which makes the numbers of magnetic induction lines entering the magnetic flux path f2 and the magnetic flux path f3 to be better distributed, thereby reducing the local saturation of the magnetic flux path, and increasing the reluctance torque of the motor. The ends of all permanent magnet slots have bent sections bending toward the pole boundaries, which can further adjust the distribution of magnetic induction lines in each magnetic flux path to reduce local saturation. All rotor poles are evenly distributed on the circumference of the rotor.

What described above are preferred embodiments of the present disclosure, but not intended to limit the present disclosure. For those skilled in the art, various amendments and modifications can be made. Any modifications, equivalent substitutions and improvements made within the spirits and principles of the present disclosure are all within the scope of the present disclosure.

What is claimed is:

1. A rotor structure, comprising a rotor body, wherein the rotor body is provided with permanent magnet slot groups; the permanent magnet slot groups each comprise multiple layers of permanent magnet slots; the multiple layers of permanent magnet slots comprise a first permanent magnet slot; the first permanent magnet slot comprises a first permanent magnet slot section and a first bent slot;
- a first end of the first permanent magnet slot section is arranged to extend toward a rotation shaft hole of the rotor body; a second end of the first permanent magnet slot section is arranged toward an outer edge of the rotor body;
- a first end of the first bent slot is connected to the second end of the first permanent magnet slot section; a second end of the first bent slot is arranged to extend toward the outer edge of the rotor body; A denotes a distance from a midpoint of a side wall of the second end of the first bent slot, which is adjacent to the outer edge of the rotor body, to an intersection point of a geometric center line of the first permanent magnet slot section and the outer edge of the rotor body, and M denotes a width of the second end of the first permanent magnet slot section, wherein $0.6M \leq A$.

2. The rotor structure according to claim 1, wherein a first magnetic barrier bridge is formed between the second end of the first bent slot and the outer edge of the rotor body; $0.4 \times M \leq (H-H1)$, or $0.4 \times M \leq (H-H1) \leq 2 \times M$ is satisfied; wherein M denotes the width of the second end of the first permanent magnet slot section; H denotes a distance from the second end of the first permanent magnet slot section to the outer edge of the rotor body; and H1 denotes a width of the first magnetic barrier bridge.

3. The rotor structure according to claim 1, wherein
- a width of the first end of the first bent slot is less than a width of the second end of the first permanent magnet slot section, and
- a width of the second end of the first bent slot is less than the width of the second end of the first permanent magnet slot section.

4. The rotor structure according to claim 1, wherein $0.25 \times M \leq D1 \leq 0.8 \times M$, or $0.3 \times M \leq D1 \leq 0.45 \times M$, wherein M denotes a width of the second end of the first permanent magnet slot section, and D1 denotes a width of the second end of the first bent slot.

5. The rotor structure according to claim 1, wherein the first permanent magnet slot further comprises a second permanent magnet slot section;
- a first end of the second permanent magnet slot section is arranged to extend toward the rotation shaft hole of the rotor body and is connected to a first end of the first permanent magnet slot section; a second end of the second permanent magnet slot section is arranged toward the outer edge of the rotor body; and the first permanent magnet slot section and the second permanent magnet slot section are disposed at two sides of a direct-axis of the rotor body; or
- the first end of the second permanent magnet slot section arranged to extend toward the rotation shaft hole of the rotor body and is arranged to keep a distance from the first end of the first permanent magnet slot section; the second end of the second permanent magnet slot section is arranged toward the outer edge of the rotor body; and the first permanent magnet slot section and the second permanent magnet slot section are disposed at two sides of the direct-axis of the rotor body.

6. The rotor structure according to claim 5, wherein the first permanent magnet slot further comprises a second bent slot;
- a first end of the second bent slot is connected to the second end of the second permanent magnet slot section; a second end of the second bent slot is arranged to extend toward the outer edge of the rotor body; a distance between a terminal end of the second bent slot and a quadrature-axis of the rotor body is less than a distance between a terminal end of the second end of the second permanent magnet slot section and the quadrature-axis.

7. The rotor structure according to claim 6, wherein the first bent slot and the second bent slot are arranged symmetrically relative to the direct-axis.

8. The rotor structure according to claim 6, wherein the permanent magnet slot groups each further comprise a second permanent magnet slot arranged to be adjacent to the first permanent magnet slot; a magnetic flux path is formed between the first permanent magnet slot and the second permanent magnet slot; the second permanent magnet slot comprises a third permanent magnet slot section, a fourth permanent magnet slot section and a fifth permanent magnet slot section which are arranged sequentially;
- the third permanent magnet slot section, the fourth permanent magnet slot section and the fifth permanent magnet slot section are sequentially connected and form a U-shaped structure with an opening facing the outer edge of the rotor body; or
- the third permanent magnet slot section, the fourth permanent magnet slot section and the fifth permanent magnet slot section are sequentially arranged and spaced, and second magnetic barrier bridges are formed between adjacent two sections among the third permanent magnet slot section, the fourth permanent magnet slot section, and the fifth permanent magnet slot section respectively.

9. The rotor structure according to claim 8, wherein the third permanent magnet slot section comprises a third bent slot; a first end of the third bent slot is connected to an end of the third permanent magnet slot section adjacent to the outer edge of the rotor body; a second end of the third bent slot extends toward the outer edge of the rotor body and gradually approaches the quadrature-axis;
the fifth permanent magnet slot section comprises a fourth bent slot; a first end of the fourth bent slot is connected to an end of the fifth permanent magnet slot section adjacent to the outer edge of the rotor body; and a second end of the fourth bent slot extends toward the outer edge of the rotor body and gradually approaches the quadrature-axis.

10. The rotor structure according to claim 9, wherein the third bent slot and the fourth bent slot are arranged symmetrically relative to the direct-axis.

11. The rotor structure according to claim 9, wherein an extended portion of a side wall of the first bent slot adjacent to the direct-axis and an extended portion of a side wall of the second bent slot adjacent to the direct-axis form an included angle A1, and an extended portion of a side wall of the first permanent magnet slot section adjacent to the direct-axis and an extended portion of a side wall of the second permanent magnet slot section adjacent to the direct-axis form an included angle A , wherein $2 \times A \leq A1$.

12. The rotor structure according to claim 11, wherein an extended portion of a side wall of the third bent slot adjacent to the direct-axis and an extended portion of a side wall of the fourth bent slot adjacent to the direct-axis form an included angle B1, and an extended portion of a side wall of the third permanent magnet slot section adjacent to the direct-axis and an extended portion of a side wall of the fifth permanent magnet slot section adjacent to the direct-axis form an included angle B, wherein $2 \times B \leq B1$; and $1.1 \times B1 \leq A1$.

13. The rotor structure according to claim 8, wherein the rotor structure further comprises a first permanent magnet and a second permanent magnet; the first permanent magnet is disposed in the first permanent magnet slot; the second permanent magnet is disposed in the second permanent magnet slot;

an included angle $\alpha1$ is formed between the direct-axis of the rotor body and a straight line, which connects a center of the rotation shaft hole of the rotor body and a point which is adjacent to the edge of the rotor body and in a surface of the first permanent magnet adjacent to the direct-axis side of the rotor body; an included angle $\alpha2$ is formed between the direct-axis of the rotor body and a straight line which connects the center of the rotation shaft hole of the rotor body and a point which is adjacent to the edge of the rotor body and in a surface of the second permanent magnet (30) adjacent to the direct-axis side of the rotor body and, and $1.3\times(\sin\alpha1/\sin\alpha2)\leq S1/S2\leq 2\times(\sin\alpha1/\sin\alpha2)$, wherein S1 is an area of a surface of the first permanent magnet adjacent to the direct-axis of the rotor body, and S2 is an area of a surface of the second permanent magnet adjacent to the direct-axis of the rotor body.

14. The rotor structure according to claim 13, wherein a thickness of the first permanent magnet is M1, and a thickness of the second permanent magnet is M2, wherein $1.1M1\leq M2\leq 1.8\times M1$.

15. The rotor structure according to claim 13, wherein the second permanent magnet slot comprises the third permanent magnet slot section and the fifth permanent magnet slot section; the third permanent magnet slot section comprises a third bent slot; the fifth permanent magnet slot section comprises a fourth bent slot; a width of a second end of the third bent slot and a width of a second end of the fourth bent slot is D2, and M2 denotes the thickness of the second permanent magnet, wherein $D2\leq 0.6\times M2$.

16. The rotor structure according to claim 13, wherein P denotes a midpoint of a straight line connecting a midpoint of a side wall of the first permanent magnet slot adjacent to the rotation shaft hole of the rotor body with a closest point in the edge of the rotor body; an arc is drawn in a circumferential direction of the rotor body by taking a center of the rotor body as a center of the arc and taking a distance from the center to the point P as a radius; along the arc, a total sum of thicknesses of the first permanent magnet and the second permanent magnet is M3, and a circumference of the arc is C1, wherein M3/C1=T2, and $45\%\leq T2\leq 70\%$.

17. The rotor structure according to claim 13, wherein L denotes a length of a surface of the first permanent magnet disposed in the first permanent magnet slot section or in the second permanent magnet slot section; the surface of the first permanent magnet is adjacent to the direct-axis; and C denotes a maximum width between the first permanent magnet slot section and the second permanent magnet slot section, wherein $0.8\times C\leq L$.

18. The rotor structure according to claim 1, wherein multiple permanent magnet slot groups are provided and evenly arranged around the rotor body.

19. A permanent magnet auxiliary synchronous reluctance motor, comprising the rotor structure of claim 1.

20. An electric vehicle, comprising the rotor structure of claim 1.

* * * * *